United States Patent
Woloszyn

(10) Patent No.: US 9,647,989 B2
(45) Date of Patent: May 9, 2017

(54) SYSTEM AND METHOD OF DATA INTERCEPTION AND CONVERSION IN A PROXY

(75) Inventor: Terrence Peter Woloszyn, Orangeville (CA)

(73) Assignee: Symantec Corporation, Mountain View, CA (US)

( * ) Notice: Subject to any disclaimer, the term of this patent is extended or adjusted under 35 U.S.C. 154(b) by 109 days.

(21) Appl. No.: 13/450,829

(22) Filed: Apr. 19, 2012

(65) Prior Publication Data

US 2012/0278621 A1 Nov. 1, 2012

Related U.S. Application Data

(60) Provisional application No. 61/479,634, filed on Apr. 27, 2011.

(51) Int. Cl.

| | |
|---|---|
| *G06F 7/04* | (2006.01) |
| *H04L 29/06* | (2006.01) |
| *G09C 1/00* | (2006.01) |
| *H04L 29/12* | (2006.01) |
| *G06F 21/10* | (2013.01) |

(Continued)

(52) U.S. Cl.
CPC .......... *H04L 63/0281* (2013.01); *G06F 21/10* (2013.01); *G09C 1/00* (2013.01); *H04L 61/2596* (2013.01); *H04L 61/301* (2013.01); *H04L 63/0815* (2013.01); *G06F 21/602* (2013.01); *H04L 67/02* (2013.01); *H04L 67/28* (2013.01)

(58) Field of Classification Search
CPC .. G06F 21/335; G06F 21/45; G06F 17/30091; G06F 17/2725; G06Q 20/385; H04L 43/04; H04L 63/1408; H04L 51/10; H04L 67/16; H04L 63/08; H04L 63/0428; H04L 63/04; H04L 63/0807

See application file for complete search history.

(56) References Cited

U.S. PATENT DOCUMENTS

| | | |
|---|---|---|
| 5,270,712 A | 12/1993 | Iyer et al. |
| 6,081,900 A | 6/2000 | Subramaniam |
| 6,981,217 B1 | 12/2005 | Knauft |

(Continued)

OTHER PUBLICATIONS

PerspecSys Business Overview, Apr. 14, 2011, 003, Apr. 14, 2011, 12 pages.

(Continued)

*Primary Examiner* — Mohammad W Reza
*Assistant Examiner* — Carlton Johnson
(74) *Attorney, Agent, or Firm* — Holland & Hart LLP

(57) ABSTRACT

An intercepting proxy server processes traffic between an enterprise user and a cloud application which provides Software as a Service (SaaS). The intercepting proxy server provides interception of real data elements in communications from the enterprise to the cloud and replacing them with obfuscating information by encrypting individual real data elements without disturbing the validity of the application protocol. To the processing cloud application real data are only visible as encrypted tokens. Tokens included in results returned from the cloud, are intercepted by the intercepting proxy server, and replaced with the corresponding sensitive real data. In this way, the enterprise is able to enjoy the benefits of the cloud application, while protecting the privacy of real data.

29 Claims, 9 Drawing Sheets

(51) Int. Cl.
*G06F 21/60* (2013.01)
*H04L 29/08* (2006.01)

(56) References Cited

U.S. PATENT DOCUMENTS

| | | | |
|---|---|---|---|
| 7,788,711 B1 | 8/2010 | Sun et al. | |
| 8,447,983 B1 | 5/2013 | Beck et al. | |
| 8,458,487 B1 | 6/2013 | Palgon et al. | |
| 8,489,923 B1 | 7/2013 | Lakshminarayanan et al. | |
| 8,583,788 B2* | 11/2013 | Burch et al. | 709/224 |
| 2002/0116344 A1 | 8/2002 | Kinoshita et al. | |
| 2002/0157019 A1 | 10/2002 | Kadyk | |
| 2003/0055849 A1 | 3/2003 | Thure | |
| 2004/0044768 A1 | 3/2004 | Takahashi | |
| 2004/0049702 A1 | 3/2004 | Subramaniam | |
| 2004/0151308 A1 | 8/2004 | Kacker | |
| 2005/0013811 A1 | 1/2005 | Chen | |
| 2006/0021018 A1 | 1/2006 | Hinton et al. | |
| 2006/0048216 A1 | 3/2006 | Hinton et al. | |
| 2006/0136990 A1 | 6/2006 | Hinton | |
| 2007/0136480 A1 | 6/2007 | Stephenson | |
| 2007/0234408 A1 | 10/2007 | Burch et al. | |
| 2009/0048997 A1 | 2/2009 | Manickam | |
| 2009/0158367 A1 | 6/2009 | Myers | |
| 2009/0177761 A1 | 7/2009 | Meyer et al. | |
| 2009/0249082 A1 | 10/2009 | Mattsson | |
| 2009/0249439 A1 | 10/2009 | Olden | |
| 2010/0031317 A1 | 2/2010 | Mason et al. | |
| 2010/0100925 A1 | 4/2010 | Hinton | |
| 2011/0004753 A1 | 1/2011 | Gomi et al. | |
| 2011/0013771 A1 | 1/2011 | Camenisch et al. | |
| 2011/0138453 A1 | 6/2011 | Verma et al. | |
| 2011/0154467 A1* | 6/2011 | Bomar et al. | 726/9 |
| 2011/0294483 A1* | 12/2011 | Sathish | 455/418 |
| 2011/0307486 A1 | 12/2011 | Breslau et al. | |
| 2012/0030294 A1 | 2/2012 | Piernot et al. | |
| 2012/0072979 A1 | 3/2012 | Cha et al. | |
| 2012/0072992 A1 | 3/2012 | Arasaratnam et al. | |
| 2012/0124658 A1 | 5/2012 | Brudnicki et al. | |
| 2012/0204032 A1 | 8/2012 | Wilkins et al. | |
| 2012/0311330 A1 | 12/2012 | Zhang et al. | |

OTHER PUBLICATIONS

PerspecSys PRS V1-04-16, Release Notes, Mar. 14, 2011, 24 pages.
Kelly-Lewis-Web-Single-Sign-On: ad—pp. 1-2, May 29, 2012.
http://en.wikipedia.ord/wiki/SAML_2.0—pp. 1-27; Apr. 6, 2011.
http://wiki.developerforce.com/page/Single_Sign-On_with_SAML_on_Force.com—pp. 1-7, 2011.
http://en.wikipedia.org/wiki/Reverse_proxy Apr. 2, 2011.
http://www.w3.org/TR/xmldsig-core/—XML Signature Syntax and Processing, Second Ed. Jun. 10, 2008, Mark Bartel et al.
http://docs.oasis-open.org/security/saml/v2.0/saml-bindings-2.0-os.pdf—Conor P. Cahill, et al, pp. 1-46, Mar. 15, 2005.
(https://tools.ietf.org/html/rfc2616)—Fielding et al, pp. 1-176, Jun. 1999.
Wikipedia:en.wikipedia.org/wiki/Domain_name—Apr. 17, 2011 pp. 1-2.
Wikipedia:en.wikipedia.org/wiki/Fully_qualified_domain_name—Apr. 7, 2011, pp. 1-2.
Wikipedia:en.wikipedia.org/wiki/Uniform_resource_locator—Apr. 19, 2011, pp. 1-5.
http://www.w3schools.com/js/—Mar. 2011.
http://en.wikipedia.org/wiki/JavaScript—pp. 1-34, Apr. 26, 2011.
http://msdn.microsoft.com/en-us/magazine/cc163419.aspx—MSDN Magazine Ray Djajadinate Create Advanced Web Applications with Object-Oriented Techniques May 2007.
Kelly-Lewis-Web-Single-Sign-On ad—pp. 1-2.
Liver, B et al, "Privacy in Service Oriented Architectures: SOA Boundary Identity Masking for Enterprises", 12th IEEE International Conference on Commerce and Enterprise Computing, 2010, pp. 204-211.
Makoto Hatakeyama, Federation Proxy for Cross Domain Identity Federation, NEC Corporation, Common Platform Software Res. Lab., Nov. 2009, pp. 53-62.
Nick Kew, Running a Reverse Proxy with Apache, http://www.apachetutor.org/admin/reverseproxies, Jan. 2004, pp. 1-11.

* cited by examiner

SYSTEM AND METHOD OF DATA INTERCEPTION AND CONVERSION IN A PROXY

RELATED APPLICATIONS

The present application claims benefit from the U.S. provisional application Ser. No. 61/479,634 filed on Apr. 27, 2012, entire contents of which are incorporated herein by reference.

FIELD OF THE INVENTION

The present invention relates to network appliances, specifically proxy servers, mail transfer agents, and file transfer agents, and in particular, to a system and method of data interception and conversion in a proxy.

BACKGROUND OF THE INVENTION

Cloud computing has come to the forefront of information technology, and is being adopted by organizations in all sectors and jurisdictions. Cloud computing itself can be segmented into three types—Infrastructure as a Service (IaaS), Platform as a Service (PaaS), and Software as a Service (SaaS).

In a SaaS model, the enterprise no longer installs, configures, and manages the software application on their own premises and computing facilities—instead the software is installed and managed by a 3rd party vendor (the Cloud Vendor) that amortizes the costs of the ongoing management and maintenance of the application across the plurality of customers using it. The enterprise itself merely needs to provide its users with web browser-based workstations in order to access the software.

The challenges facing enterprise adoption of cloud SaaS is the loss of control and governance over the application and data itself. With the application and the underlying information (customer records, orders, employee information, etc.) now residing "In the cloud", the enterprise may find itself unable to be compliant with jurisdictional regulatory requirements, sector-specific regulations and standards, or their own internal security and data management guidelines. In a number of cases, even encryption is not sufficient for obfuscating the data for persistence in the cloud.

One of the primary barriers to adoption of cloud-based applications (SaaS) is the inability for an enterprise to place sensitive data into the cloud, where it would be external to the enterprise environment and control. For example, Swiss banks must adhere to stringent data protection laws wherein the customer information must not leave the Swiss jurisdiction. Similarly, employee information must never leave the shores of Australia, and personally identifying information must not leave mainland China in any format. As a result, these potential Cloud application adopters are unable to adopt a solution providing for example CRM/SFA (Customer Relationship Management/Sales Force Automation) support available from salesforce.com, because the data would be residing in the salesforce.com data centers in California.

Accordingly, there is a need in the industry for developing improved computer methods and systems, which would solve the above noted problems and avoid the shortcomings of the prior art.

SUMMARY OF THE INVENTION

There is an objective of the present invention to provide an improved system and method of data interception and conversion in a proxy.

According to one aspect of the invention, there is provided a method of obfuscating data in a data object, comprising:
  receiving, by an intercepting proxy server computer, the data object from a client device;
  at the intercepting proxy server computer, generating a modified data object for transmission to a server computer in a cloud, comprising:
    (i) identifying a real data element in the data object;
    (ii) creating a token having a token value by encrypting the real data element;
    (iii) concatenating a predetermined prefix and the token value to generate a replacement value; and
    (iv) replacing the real data element with the replacement value, thus generating the modified data object.

The method further comprises transmitting the modified data object from the intercepting proxy server computer to the server computer in the cloud.

The method further comprises:
  receiving a returned data object, comprising a returned data element, from the server computer in the cloud;
  identifying the returned data element as a token-to-be-replaced;
  replacing the token-to-be-replaced with the real data element, thereby generating a modified returned data object; and
  transmitting the modified returned data object to the client device.

The concatenating further comprises adding a predetermined suffix to the replacement value.

The identifying the real data element further comprises:
  mapping the data in the data object against a dictionary of attributes; and
  identifying the real data element using a corresponding attribute in the dictionary.

Alternatively, the identifying the token-to-be-replaced further comprises:
  mapping data in the returned data object against a dictionary of attributes; and
  identifying the token-to-be-replaced using a corresponding attribute of the returned data element of the returned data object.

The replacing the token-to-be-replaced further comprises:
  extracting the token value from the token-to-be-replaced; and
  generating the real data element, comprising decrypting the token value.

The replacing the token-to-be-replaced further comprises formatting the real data element according to a context in the returned data object.

According to another aspect of the invention, there is provided an intercepting proxy server computer, comprising:
  a processor;
  a memory having computer readable instructions stored thereon for execution by the processor, causing the processor to obfuscate data in a data object, comprising:
  receiving a data object from a client device;
  generating a modified data object for transmission to a server computer in a cloud, comprising:
    (i) identifying a real data element in the data object;
    (ii) creating a token having a token value by encrypting the real data element;

(iii) concatenating a predetermined prefix and the token value to generate a replacement value; and (v) replacing the real data element with the replacement value, thus generating the modified data object.

In the intercepting proxy server computer, the computer readable instructions further cause the processor to transmit the modified data object from the intercepting proxy server computer to the server computer in the cloud.

In the intercepting proxy server computer, the computer readable instructions further cause the processor to:
receive a returned data object, comprising a returned data element, from the server computer in the cloud;
identify the returned data element as a token-to-be-replaced;
replace the token-to-be-replaced with the real data element, thereby generating a modified returned data object; and
transmit the modified returned data object to the client device.

In the intercepting proxy server computer, wherein the computer readable instructions for concatenating further cause the processor to add a predetermined suffix to the replacement value.

I the intercepting proxy server computer, the computer readable instructions for identifying the real data element further cause the processor to:
map the data in the data object against a dictionary of attributes; and
identify the real data element using a corresponding attribute in the dictionary.

In the intercepting proxy server computer, the computer readable instructions to identify the token-to-be-replaced further cause the processor to:
map data in the returned data object against a dictionary of attributes; and
identify the token-to-be-replaced using a corresponding attribute of the returned data element of the returned data object.

In the intercepting proxy server computer, the computer readable instructions to replace the token-to-be-replaced further cause the processor to:
extract the token value from the token-to-be-replaced; and
generate the real data element, comprising decrypting the token value.

In the intercepting proxy server computer, the computer readable instructions to replace the token-to-be-replaced further cause the processor to format the real data element according to a context in the returned data object.

A computer network is also provided, comprising the intercepting proxy server computer described above.

According to yet another aspect of the invention, there is provided an intercepting proxy server computer, comprising:
a processor including a network input/output (IO) system configured to receive a data object from a client device;
a memory having computer readable instructions stored thereon for execution by the processor, causing the processor to obfuscate data in a data object and generate a modified data object for transmission to a server computer in a cloud, the computer readable instructions forming:
a tooling module for identifying a real data element in the data object;
a token generator module for creating a token having a token value by encrypting the real data element;
a token packaging module for concatenating a predetermined prefix and the token value to generate a replacement value, and replacing the real data element with the replacement value, thus generating the modified data object.

In the intercepting proxy server computer, the network input/output (TO) system is further configured to transmit the modified data object from the intercepting proxy server computer to the server computer in the cloud.

In the intercepting proxy server computer described above:
the network input/output (TO) system is further configured to receive a returned data object, comprising a returned data element, from the server computer in the cloud;
the tooling module is further configured to identify the returned data element as a token-to-be-replaced;
the intercepting proxy server computer further comprising a context formatting module configured to replace the token-to-be-replaced with the real data element, thereby generating a modified returned data object; and
the network input/output (TO) system is further configured to transmit the modified returned data object to the client device.

In the intercepting proxy server computer, the token packaging module is further configured to add a predetermined suffix to the replacement value.

In the intercepting proxy server computer, the tooling module is further configured to map the data in the data object against a dictionary of attributes and identify the real data element using a corresponding attribute in the dictionary.

In the intercepting proxy server computer, the tooling module is further configured to map data in the returned data object against a dictionary of attributes and identify the token-to-be-replaced using a corresponding attribute of the returned data element of the returned data object.

In the intercepting proxy server computer, the computer readable instructions further forming a decryption module configured to extract the token value from the token-to-be-replaced and to generate the real data element by decrypting the token value.

In the intercepting proxy server computer, the computer readable instructions further forming a context formatting module configured to format the real data element according to a context in the returned data object.

A computer network is also provided, comprising the intercepting proxy server computer described above.

Thus, the improved system and method of data interception and conversion in a proxy have been provided.

BRIEF DESCRIPTION OF THE DRAWINGS

Embodiments of the invention will now be described, by way of example, with reference to the accompanying drawings in which.

DETAILED DESCRIPTION OF THE EMBODIMENTS OF THE INVENTION

With the objective to overcome limitations of the prior art to protect sensitive data when using cloud applications, a novel intercepting proxy server has been developed by PerspecSys corporation, features and embodiments of which are described in the following. Disclosed are a system and methods for allowing an enterprise to utilize a cloud SaaS solution, while ensuring that the sensitive data remain out of the cloud itself, replaced only with obfuscated information. This allows the enterprise to remain compliant with their data management requirements, as the data truly never leaves the enterprise in any format, encrypted or otherwise. The proposed solution provides a means of allowing the data to be replaced with an obfuscated version of the data that is not computationally related to the original sensitive value. In this way, the enterprise is able to enjoy the benefits of a cloud application such as salesforce.com, while remaining compliant with any and all regulatory compliance requirements that preclude the sensitive data from leaving the enterprise in any format.

Figure 1:
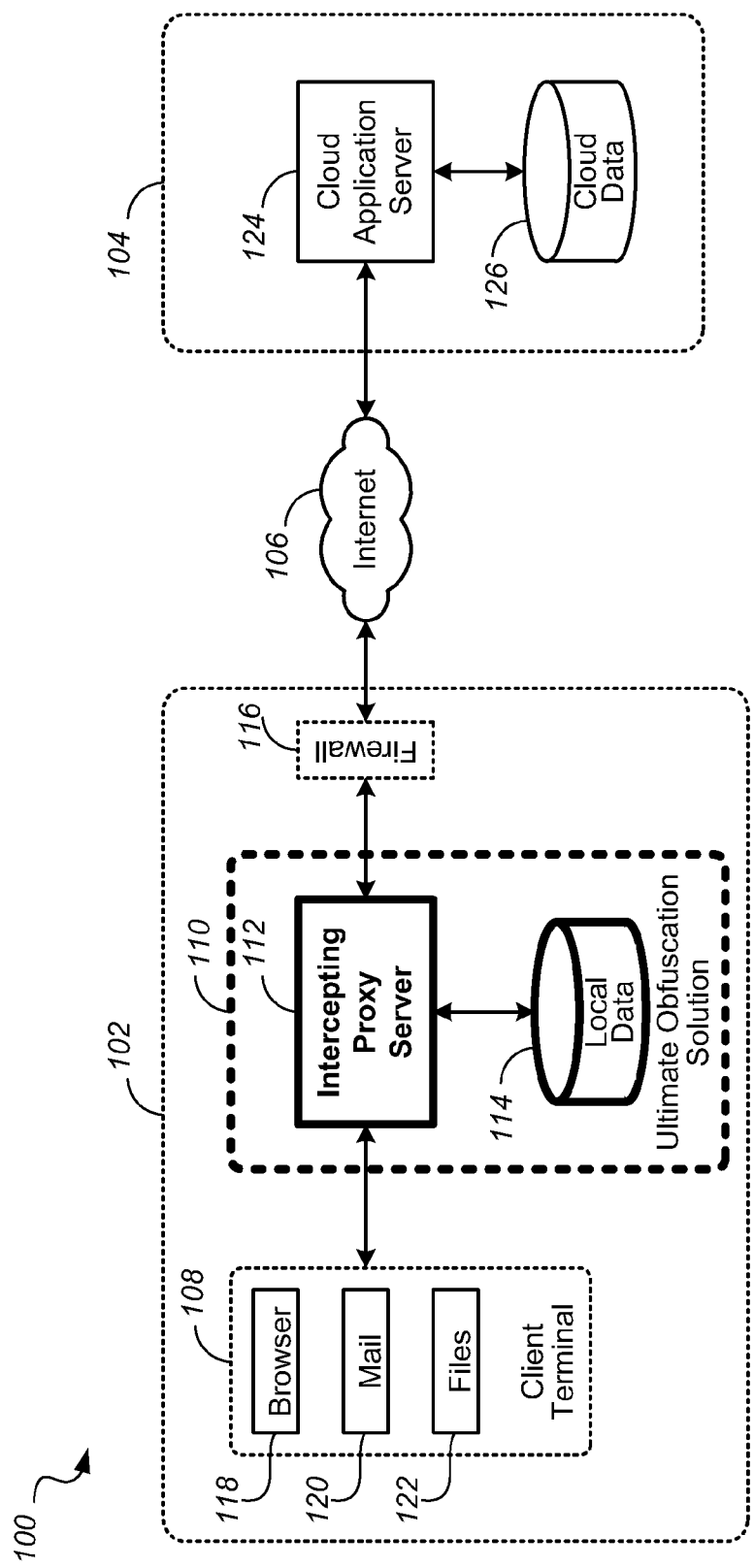
FIG. 1 shows an Ultimate Obfuscating system 100, including an Ultimate Obfuscation Solution 110 comprising an Intercepting Proxy Server computer 112, according to an embodiment of the invention.

FIG. 1 shows an Ultimate Obfuscating system 100 according to the invention, including: an enterprise installation 102 (also simply referred to as "enterprise" 102) and a cloud application installation 104 in a server computer in the cloud (also simply referred to as "Cloud" 104), the enterprise 102 and Cloud 104 being connected over the Internet 106.

The enterprise 102 includes one or more client devices 108 (also simply referred to as Client 108), an Ultimate Obfuscation Solution 110 comprising an Intercepting Proxy Server computer 112 and a Local Persistent Storage layer 114, and a conventional firewall 116.

The Ultimate Obfuscation Solution 110 shown here inside an enterprise, is shown as an example for deploying it. It is understood that there may be clients, for example in the United Kingdom where a restriction exists only in that the data must not leave the country. In such a case the Ultimate Obfuscation Solution 110 may be located in a datacenter (i.e. a Hosted Ultimate Obfuscation Solution) in a country, with the client devices 108 being located in one or more enterprises within the same country. The Hosted Obfuscation Solution is then capable of providing support for multiple enterprises.

The client device 108 may be a personal computer, a work station computer, a laptop computer, a "smart" device such as a mobile device or a tablet, or any other computer device capable of including one or more of: a web browser application 118 (also simply referred to as browser 118) using for example standard Hypertext Transfer Protocol (HTTP); an electronic mail application 120 (also simply referred to as mail 120) using for example Simple Mail Transfer Protocol (SMTP); and computer files 122 (also simply referred to as files 122) which may be transferred for example using the File Transfer Protocol (FTP), for communicating with the Cloud 104 by way of the Ultimate Obfuscation Solution 110.

The cloud application installation 104 includes one or more Cloud Application servers 124 and a Cloud Storage device 126.

The term computer is understood to mean a device that includes a processor, and computer-readable instructions stored in a computer-readable memory for execution on the processor. Any of the computers used in the present invention may be a general purpose computer such as any of a number of commercially available computers. Alternatively, each computer may be a specialized computer, or a hardware device such as a programmable application specific device.

The operation of the Ultimate Obfuscating system 100 is summarized as follows. The client 108 communicates with the Cloud 104 in transactions containing subject data for storing and/or processing in the Cloud 104 and receiving appropriate responses, including data from the Cloud 104. Such transactions may involve any of the facilities in the Client 108, including the web browser application 118, the electronic mail application 120, and file transfer of computer files 122. In such transactions, the outbound subject data are intercepted and interpreted in the Intercepting Proxy Server computer 112, where selected sensitive data elements of the outbound subject data are replaced with respective replacement values, also referred to as "tokens". In the following, the terms "sensitive data" and "sensitive data element" will be used interchangeably with the terms "real data" and "real data element" respectively to distinguish the real data from the tokens which are their tokenized or obfuscated replacements. Each of the selected real data elements may be stored, along with the corresponding replacement token, in the Local Persistent Storage layer 114. Any tokens in the response from the Cloud 104 are then identified by the Intercepting Proxy Server computer 112, and the corresponding real data elements are retrieved, and substituted for the tokens in the response. In this way, the client 108 interacts with the Cloud 104 normally and transparently, but any real data are hidden from the Cloud 104 by sending tokens instead. The tokens will then be received and processed by the Cloud Application server 124 and may be stored in the Cloud Storage device 126.

There are two types of obfuscating tokens: "resident tokens" used in a "Residency" mode of operation and "encrypted tokens" used in a "Privacy" mode of operation. In the residency mode, each real data element is stored locally, i.e. "resides" in the Local Persistent Storage layer 114 as described above. In the weaker privacy mode, the real data element does not need to be stored locally, but is encrypted into an encrypted token.

Table 1 below illustrates examples of both resident tokens (R) and encrypted tokens (E).

TABLE 1

Example of Tokens

| # Type of Data | Type of Token | Example Token |
|---|---|---|
| 1 Text data element (e.g. First Name) | R | prs_ABDDK_z |
| 2 Text data element (e.g. First Name) | E | PJW_EX_9bf785dab65e65a740d823b137c de867ffbfb977_Mev5ge~eyQ7dPs74t3fSYP mqEw1C9oFT0AemHiMUpwgLGBVG2cE TQD6CivtJ1c3LZNSfSK5OwmYNFceMZ~ QrEiGI/dh3OKhEOUwCQrNRuNzZofgA7~~/ QJznbmVBkn8zEg0rkgDevhMPPhbyqkH cVhYFbUlXRxckgMT9T9rOBUzdrg9usZA OkqmsFhriwqH0XseALVOcazRWJuPR616 nhIdLs4DAUr5gVn8Nww=_Z |
| 3 Text of an email address | R | prs_DABCZRK_z@dummymail.com |
| 4 Two text data elements with sort prefix codes | R | PJW_DONdvcK_Z PJW_DPScfpJ_Z |
| 5 File Attachment (e.g. Powerpoint presentation) | R | prs_ATTACH[/2012/02/23/PJW-201202031252-869473701498022.EXT]ENDATTACH |

Each token is composed of a token prefix, a token body, and a token suffix. The token prefix and token suffix are used to delineate the token against the surrounding data in order to identify the tokens in the data stream. Token prefix and suffix are shown in bold in the examples of Table 1. The prefix may for example comprise three predetermined alpha characters followed by an underscore, e.g. prs_ or PJW_. As this example shows, the suffix may be an underscore followed by a single letter e.g. _z or _Z. The length of both prefix and suffix are configurable. The requirement is that they be unique enough so as not to be part of the data itself. For example if the actual data contained ABC_Z then ABC would not be a good choice for a prefix.

Table 1 shows five examples of tokenization (#1 to #5) in three columns: Type of Data, Type of Token (R for Resident Token, (E) for Encrypted token), and Example Token.

In example #1, a simple text data element such as a first name is replaced with a resident token (R) as prs_ABDDK_z.

In example #2, a simple text data element such as a first name is replaced with an encrypted token (E), with prefix PJW_, token body which is a long string of random-looking characters (the result of encrypting the actual text data element), and token suffix _Z.

In example #3, an email address is replaced with an obfuscation token (R) as prs_DABCZRK_z. This is followed with an email domain name such as "@dummymail.com" in order for the combination to appear as a valid email address and so formally satisfy validation when the (obfuscated) data is received in the cloud.

In example #4, two text data elements are shown, resulting in two type (R) tokens PJW_DONdvcK_Z and PJW_DPScfpJ_Z, where each token is extended with a sort prefix code "DO" and "DP" respectively. As will be explained in more detail below, the alphabetic sorting order of the original text data elements can be preserved in the corresponding replacement tokens by prefixing token values with the order-preserving prefix code.

In example #5, an attached file is replaced by a type (R) token enclosed in square brackets "[" and "]" and separated from the prefix and the suffix by keywords "ATTACH" and "ENDATTACH" respectively.

The attachment example in #5 shows a format used for resident attachments. The format of tokens for attachments is different from other tokens in order to specifically identify them as attachments. In the example of a resident attachment shown here, the value in the token is a relative path of where the file is stored. Although it is in clear text providing the location of the actual file in the Local Persistent Storage layer 114, the file name, or what is in the file is not discernible from the information in the token. The attachment example #5 of Table 1 is shown to indicate another technique of substituting tokens for real data, e.g. attachments, which may be performed in the Ultimate Obfuscation Solution 110.

The following description of embodiments of the invention however, will be focused on cases of obfuscating tokens for general values, i.e. text values.

The resident tokens for general values are generated by a random token generator in the Intercepting Proxy Server computer 112. It is noted that tokenization with randomly generated resident tokens is considered a more secure method than encryption. In tokenization, the resident token contains no discoverable information related to the subject data. For example, it is possible that a large amount of data, including an entire attachment is represented by a relatively short resident token. For a resident token representing an attachment, a reference pointer to a local directory location is used, the implementation and format of which may vary depending on the cloud application requirements. On the other hand, an encrypted token, containing simple an encrypted version of the subject data is open to be decrypted by an Internet eaves-dropper or by an adversary hacking into the Cloud Storage device 126 as long as they have the decryption key.

The tokens, variously referred to as "resident token" and "encrypted token" are also collectively referred to as "index", and the processes of "tokenization" and "encrypting" are similarly also referred to as "indexing", referring to the use of a token as a key (index) for storing and retrieving the corresponding real data element in a look up table or database of the Local Persistent Storage layer 114. The term "index" is used because the token for resident data is literally an index into the look up table (value table). The term "index" is equivalent to "token", and the term "indexing" is equivalent to "tokenizing".

In some cases, complete obfuscation of a data element by replacement with a resident token may not be required. In this case it may be sufficient to use as replacement value an encrypted token in which the data element is merely encrypted.

With resident tokens, the real data element is thus only stored locally inside of the firewall 116 of the enterprise 102 (or the hosted environment), i.e. in the Local Persistent Storage layer 114 of the Ultimate Obfuscation Solution 110. The Local Persistent Storage layer 114 may be implemented in a persistent storage device of any of a number of persistent storage technologies including, but not limited to, for example one or more hard disks or a solid-state drive (SSD). The type of data structure used in the Local Persistent Storage layer 114 may include flat files or a database, or an in-memory cache within the Intercepting Proxy Server computer 112 for example and may depend on the type of protocol and the type of data.

A simple example for tokenization may be a clear text string "John Smith". The corresponding token value that may be sent to the Cloud 104 instead could be a randomly generated token for which there is no computational method to reverse engineer it, for example "prs_ABDEEFS_z".

The primary purpose of the Ultimate Obfuscation Solution 110 is to intercept clear text data that is outbound from the enterprise and substitute it with replacement values, while preserving the application functionality. Likewise the replacement values that are now in the cloud application need to be converted back into the real values in any response data stream that is coming from the cloud application, for example HTML pages, XML files, Spreadsheet reports, etc.

The Ultimate Obfuscation Solution 110 is designed to support interception of any data, whether it is transported using the Transmission Control Protocol (TCP) or the User Datagram Protocol (UDP), or a file system for the purposes of substitution.

Figure 2:
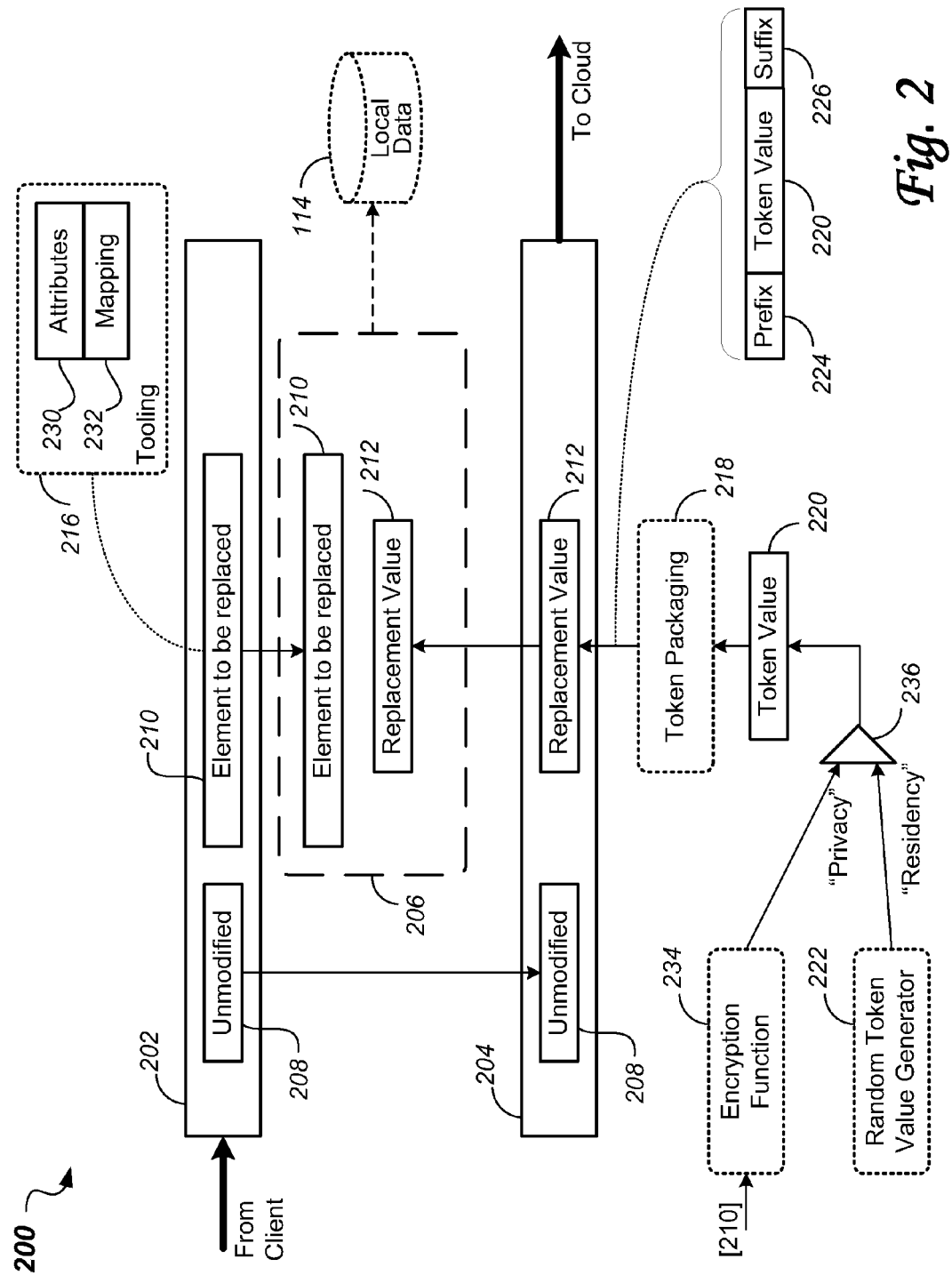
FIG. 2 is a simplified data flow diagram 200 illustrating the general principle of interception and obfuscation of data elements by replacement with obfuscating tokens that is performed in the Intercepting Proxy Server computer 112 of FIG. 1.

FIG. 2 is a simplified data flow diagram 200 illustrating the general principle of interception and obfuscation of data elements by replacement with obfuscating or encrypted tokens that is performed in the Intercepting Proxy Server computer 112, according to an embodiment of the invention.

The data flow diagram 200 shows:
 a Received Data Object 202 that is received from the Client 108;
 a corresponding modified data object 204 for transmission to the Cloud 104; and
 one or more storage record(s) 206 for storing in the Local Persistent Storage layer 114.

The Received Data Object 202 may contain non-changeable elements, referred to as "unmodified elements" 208 which are passed unchanged to the modified data object 204, and one or more "Element(s) to be replaced" 210, the Elements-to-be-replaced 210 being selected by a Tooling module 216 described in more detail below.

The modified data object 204 contains the unmodified elements 208 of the Received Data Object 202, and Replacement Values 212, which are replacements for corresponding Elements-to-be-replaced 210. The Replacement Value 212 is generated by a Token Packaging function 218 from a Token Value 220, which is generated:
 in the "Residency" mode by a Random Token Value generator function 222; or
 in the "Privacy" mode by encrypting the Element-to-be-replaced 210 in a standard Encryption Function 234.

The Random Token Value generator function 222 and the Encryption Function 234 may be considered as alternative implementations of a token generator function.

Depending on the mode, the Token Value 220 is selected by a Mode Selector 236 from either the output of the Encryption Function 234 ("Privacy" mode) or the output of the Random Token Value generator function 222 ("Residency" mode).

In one embodiment of the invention, the Token Packaging function 218 assembles the Replacement Value 212 by prefixing the random Token Value 220 with a token prefix 224 and appending a token suffix 226.

In the case of "Residency" mode, a storage record 206 including a copy of the Element-to-be-replaced 210, and a copy of the corresponding Replacement Value 212, may be created. The storage record 206 is then stored in the Local Persistent Storage layer 114, thus preserving the value of the Element-to-be-replaced 210 in local storage while only the Replacement Value 212 is forwarded to the Cloud 104.

In the case of "Privacy" mode, it is not necessary to create the storage record 206 or store it in the Local Persistent Storage layer 114.

Defining Interception Cases

What is to be intercepted, is defined by a set of metadata that describes which data elements are to be extracted based upon a context, and what obfuscation scheme is to be used.

The function of defining and selecting Elements-to-be-replaced 210 is performed in the Tooling module 216, which includes pairs of metadata records. Each pair of metadata records corresponds to one or more Elements-to-be-replaced 210 and comprises a Data dictionary of Attributes 230, and a Mapping part 232 according to which elements are selected for intercepting. A separate set of metadata may be established for each cloud application.

Figure 3:
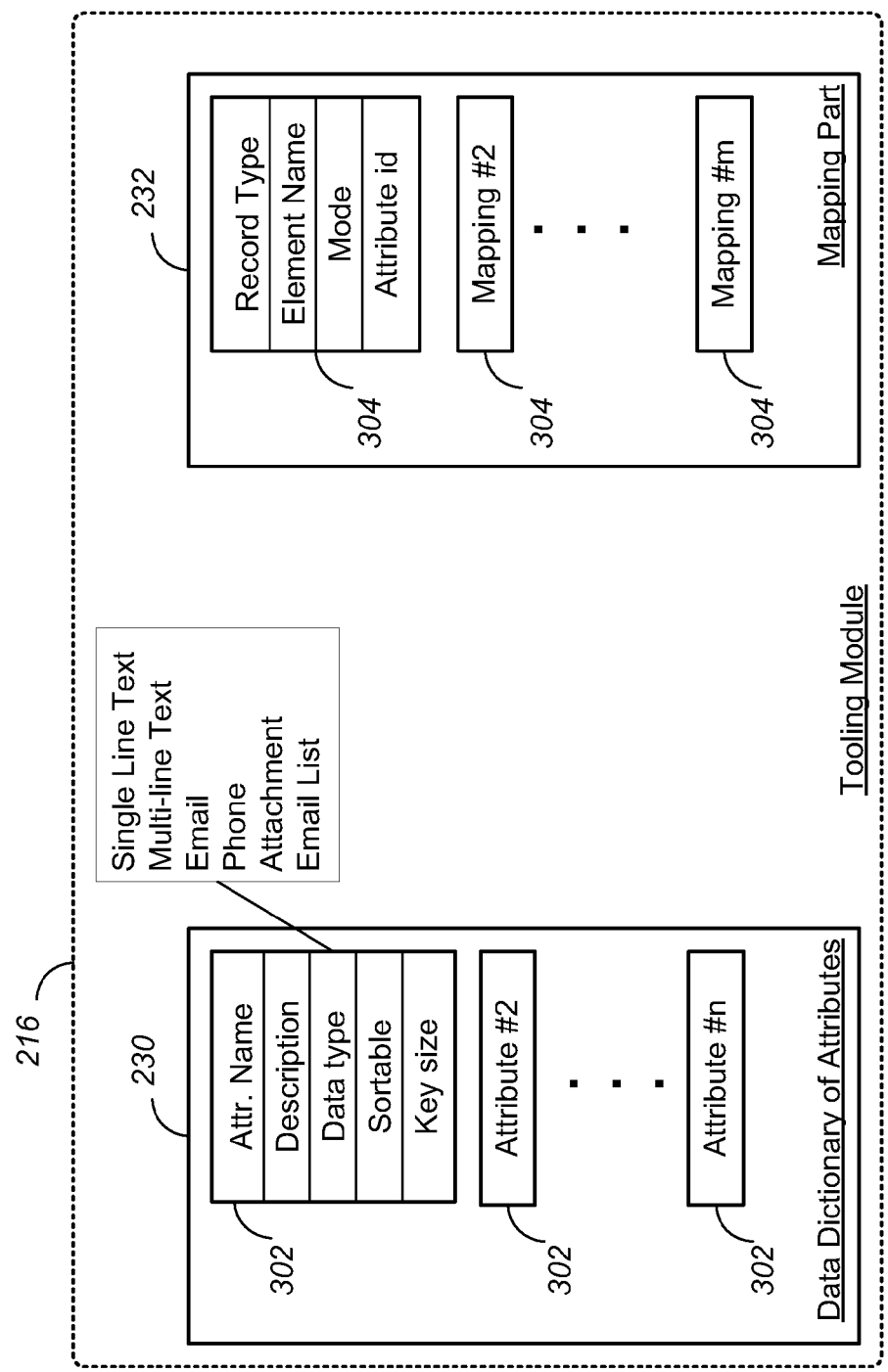
FIG. 3 shows details of the Tooling module 216, including the Data dictionary of Attributes 230 and the Mapping part 232 of FIG. 2.

FIG. 3 shows details of the Tooling module 216, including the Data dictionary of Attributes 230 and the Mapping part 232.

The Data dictionary of Attributes 230 includes a plurality "n" of individual Attributes 302. An Attribute 302 is a data dictionary element that describes a data element such as for example a first name generically and comprises the following fields:
 Name of attribute;
 Description;
 Data type, which may be one of:
  Single Line Text;
  Multi-line Text;
  Email: email formatted address;
  Phone: a phone number;
  Attachment: Binary file attachment; and
  Email List: list of email addresses used in sending email;
 Flag specifying whether the token is sortable; and
 Sorting key size.

The Mapping part 230 includes a plurality "m" of mappings 304 each of which defines the mapping of a data stream element (an element-to-be-replaced 210) to one of the Attributes 302. Each mapping 304 is an association between a data element in an HTML form or XML Application Programming Interface (API), or other identified data element to an attribute, and comprises the following fields:
 Record type, defining what object or abstract object this mapping is related to, for example an Account or an EMAIL send page). The Record type refers to an element type for interception that is pointed to by a URL.
 Element, defining the name of the element that is to be intercepted, and may refer to a form name of the element, an XML element name, or any other identifier used for structured data.

Mode, a flag specifying either "Privacy" or "Residency", where "Privacy" implies encryption and "Residency" implies locally stored data combined with tokenization.

Attribute Id, identifying one of the "n" individual Attributes that applies to the defined data element (ref 210) which is to be intercepted.

Interception of Data to Tokens

Any data that is leaving the organization in the form of a web form of data, an email, or a file attached to a web page, needs to be intercepted to replace the real data with tokens.

Figure 4:
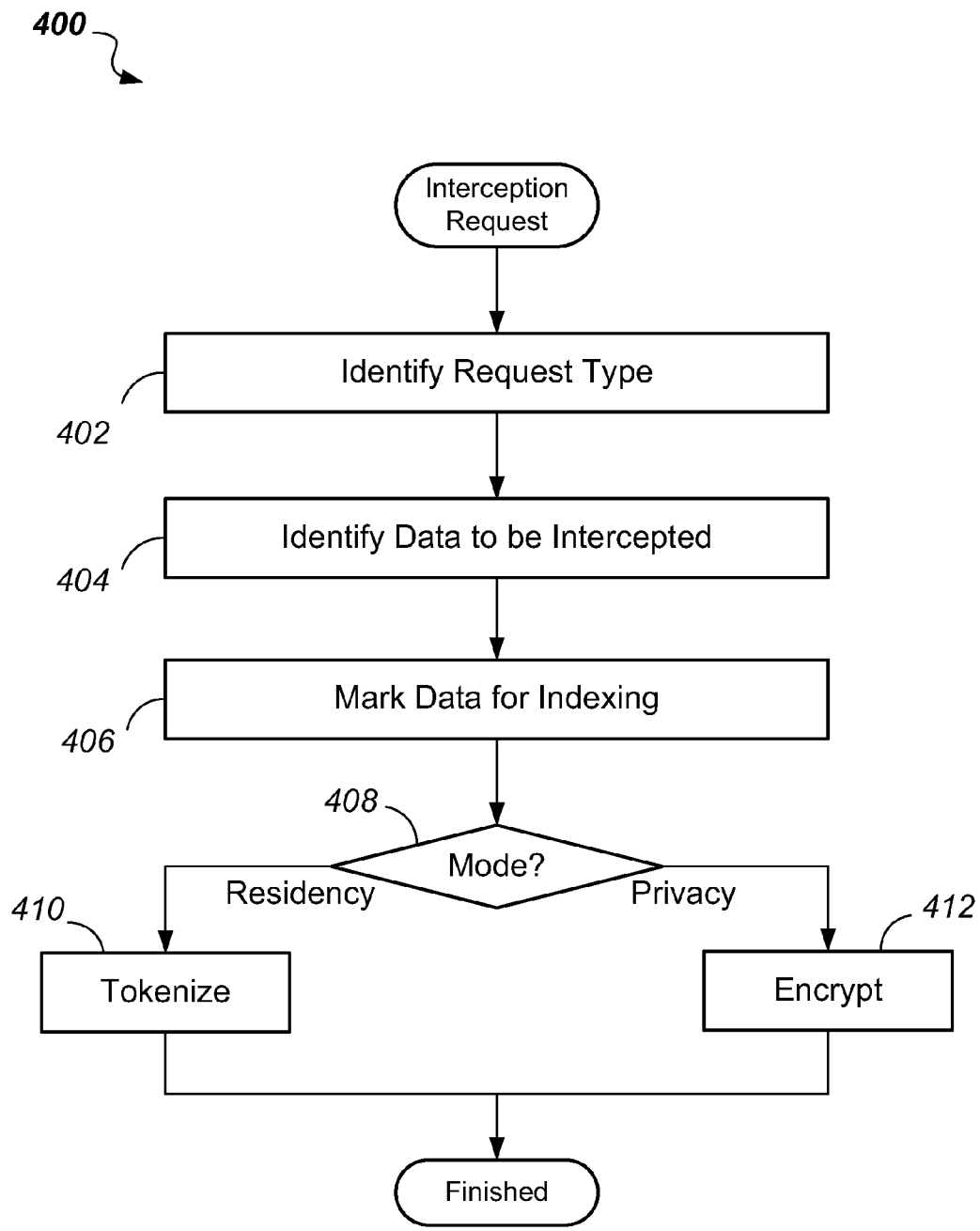
FIG. 4 is a flowchart of an "Interception Request" process 400, according to an embodiment of the invention.

FIG. 4 is a flowchart of an "Interception Request" process 400, including steps:

402 "Identify request type";
404 "Identify data to be intercepted";
406 "Mark data for indexing";
408 "Determine Mode";
410 "Tokenize"; and
412 "Encrypt".

At the step 402 "Identify request type", the type of request is identified by categorizing the Received Data Object 202 (FIG. 2), for example in the case of an HTTP request, any of the following categories may apply:

POST request with form data;
POST request with multipart data, i.e. fields and binary data;
POST request with body containing a Simple Object Access Protocol (SOAP) API or other type of XML or JavaScript Object Notation (JSON) structure;
POST request with comma delimited values;
POST request with any structured data format; and
GET request with URL data.

HTTP is provided as the most popular example since most cloud applications use HTTP based communications. But in general, data may be any network transmitted data over TCP or UDP, an example being the Simple Mail Transport Protocol (SMPT), and may be file system based, or database based.

By categorizing the Received Data Object 202 in the step 402, the Intercepting Proxy Server computer 112 is able to break up the Received Data Object 202 into individual elements.

In the following step 404 "Identify data to be intercepted", this categorization is the basis of identifying which elements remain unmodified (ref 208, FIG. 2) and which are Elements-to-be-replaced 210, i.e. elements that need to be replaced with tokens or encrypted.

The metadata of the Tooling module 216 is structured to identify by object (referred to as the Record Type in the mappings 304) which fields are to be intercepted. The Element Name of the mappings 304 is the field name in the data structure, i.e. in the Received Data Object 202, that needs to be replaced based on its attribute 302.

In summary, all elements comprising the data, for example all fields in a HTML form, are examined to determine which elements have corresponding tooling mappings.

At the step 406 "Mark data for indexing", the tooling mappings 304 are used to mark the object (the Received Data Object 202) and specific fields (Elements-to-be-replaced 210) in the object as requiring interception.

At the step 408 "Determine Mode", the Mode of the associated mapping 304 is determined. Depending on the Mode of the associated mapping 304, either tokenization ("Residency" mode) is invoked in the step 410 "Tokenize" to generate Replacement Values 212 for the intercepted elements, or the data is encrypted ("Privacy" mode) in the step 412 "Encrypt".

Figure 5A:
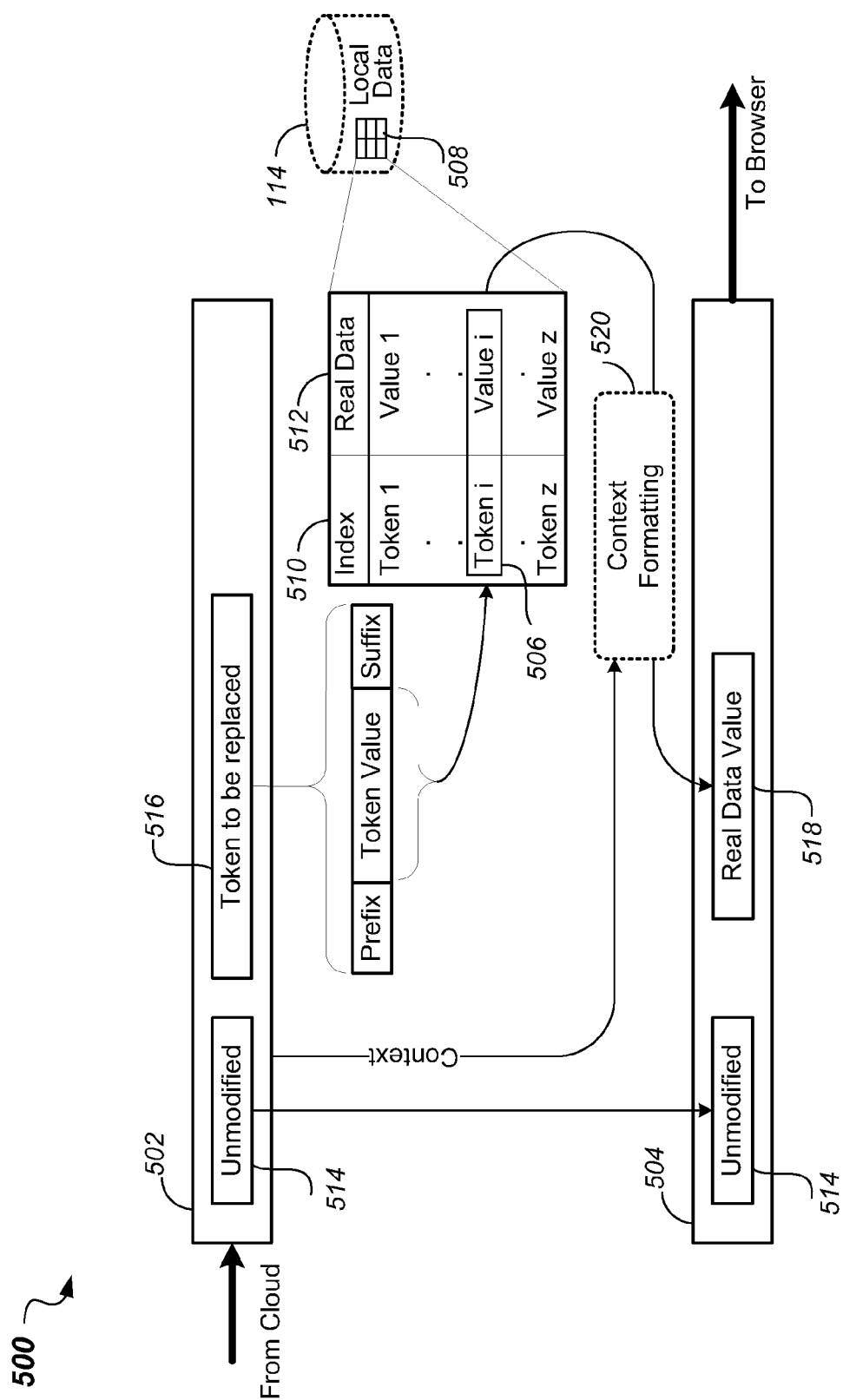
FIG. 5A is a simplified return data flow diagram 500 illustrating the general principle of interception of obfuscating tokens returned from the Cloud 104 in the case of "Residency" mode, and their replacement with real data elements, performed in the Intercepting Proxy Server computer 112 of FIG. 1, according to an embodiment of the invention.

FIG. 5A is a simplified return data flow diagram 500 illustrating the general principle of interception of resident tokens returned from the Cloud 104 in the case of "Residency" mode, and showing the replacement of the tokens with real data elements, the replacement being performed in the Intercepting Proxy Server computer 112, according to an embodiment of the invention.

The reverse data flow diagram 500 shows:

a Returned Data Object 502 that is received from the Cloud 104;
a corresponding modified returned data object 504 for transmission to the Client 108; and
a plurality of key-value pair records 506 (i=1 to z) in a look up table 508 of the Local Persistent Storage layer 114, the look up table 508 including an Index column 510 and a Real Data column 512.

The description of a preferred implementation of the look up table 508 has been simplified for clarity. In practice, the look up table 508 may be implemented as any indexed data structure indexed by the token value, e.g., as a number of flat files, or a standard database, or even as an in-memory cache within the Intercepting Proxy Server computer 112 instead of in the Local Persistent Storage layer 114.

The Returned Data Object 502 may contain unmodified elements 514 which are passed unchanged to the modified returned data object 504, and one or more returned data elements which are identified as "Token(s) to be replaced" 516, comprising Prefix, Token Value, and Suffix. The Token Value of each Token-to-be-replaced 516 is used as an index into the look up table 508 in order to retrieve the specific key-value pair record 506, which contains the value of the Token Value as its key. In the example shown here, the value of the Token Value of the Token-to-be-replaced 516 equals the value of the "Token i". As a consequence, the corresponding "Value i" in the Real Data column 512 is retrieved, and inserted into the data object 504 as a Real Data Value 518.

As described in more detail below, simply inserting the Real Data Value 518 in place of the Token-to-be-replaced 516 may give rise to format errors in the modified returned data object 504. To avoid such problems, a Context Formatting function 520 is provided to take the context in which the token is found into account, and format the Real Data Value 518 accordingly.

Referring back to FIG. 2, the storage records 206 associated with the substitution of data elements-to-be-replaced 210 by replacement values (tokens) 212 during processing of the interception request 400 (FIG. 4), correspond to the key-value pair records 506 which are now retrieved in order to replace the tokens-to-be-replaced 516 with the corresponding original Real Data values 518 which are of course equal to the original values of the respective data elements-to-be-replaced 210. It is noted that the look up table 508 may store entire storage records 206 as described in FIG. 2, indexing with tokens to retrieve corresponding real data values may be based solely on the stripped token values, or alternatively may be based on the replacement token value including any prefix and suffix values.

As shown in FIG. 5A, real data (i.e. elements-to-be-replaced 210) contained in a previous request by the Client 108 for processing in the Cloud 104, may as far as the Client 108 can determine, appear to be correctly contained in subsequent or later responses from the Cloud 104. In reality however, the sensitive data, i.e. the "real data" never physically left the enterprise 102, but were kept in the Local Persistent Storage layer 114, while the cloud application server 124 only processed the tokens.

Figure 5B:
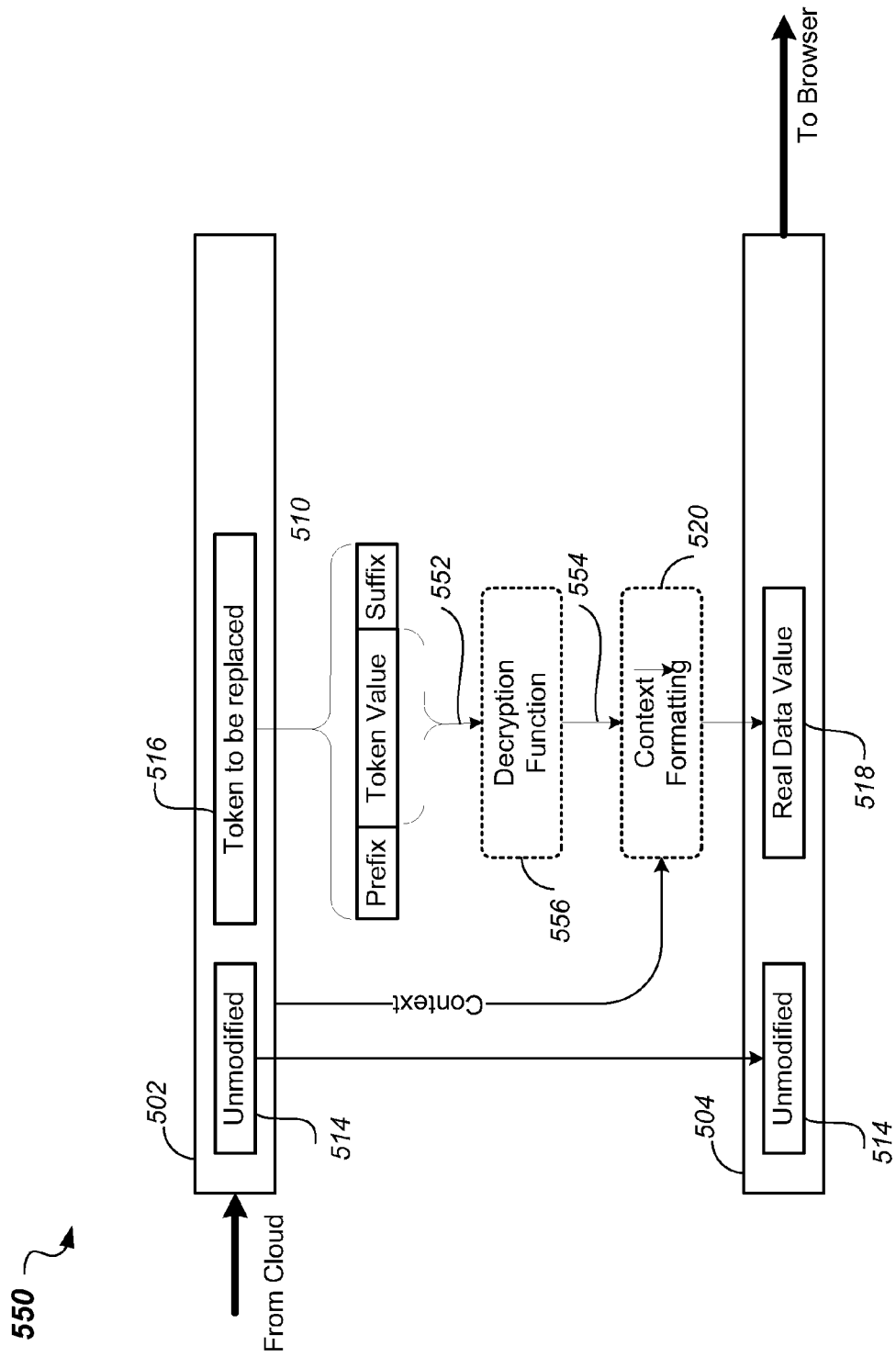
FIG. 5B is a second simplified return data flow diagram 550 illustrating the general principle of interception of obfuscating tokens returned from the Cloud 104 in the case of "Privacy" mode, and their replacement with real data elements, performed in the Intercepting Proxy Server computer 112 of FIG. 1, according to another embodiment of the invention.

FIG. 5B is a second simplified return data flow diagram 550 illustrating the general principle of interception of encrypted tokens returned from the Cloud 104 in the case of "Privacy" mode, and showing the replacement of the tokens with real data elements, the replacement being performed in the Intercepting Proxy Server computer 112, according to another embodiment of the invention.

In analogy to the reverse data flow diagram 500, the second reverse data flow diagram 550 shows:
the Returned Data Object 502 that is received from the Cloud 104; and
the corresponding modified returned data object 504 for transmission to the Client 108.

The Returned Data Object 502 may contain unmodified elements 514 which are passed unchanged to the modified returned data object 504, and one or more "Token(s) to be replaced" 516. The Token-to-be-replaced 516 includes an (encrypted) Token Value 552 which is extracted and decrypted into a Retrieved Real Data Value 554 in a Decryption Function 556. The Retrieved Real Data 554 is essentially the Real Data Value 518.

But, as described above, simply inserting the Retrieved Real Data 554 in place of the Token-to-be-replaced 516 may give rise to format errors in the modified returned data object 504. To avoid such problems, the Context Formatting function 520 is provided to take the context in which the token is found into account, and format the Retrieved Real Data 554 into the Real Data Value 518 accordingly.

As shown in FIG. 5B, real data (i.e. elements-to-be-replaced 210) contained in a previous request by the Client 108 for processing by the Cloud 104, but encrypted by the Intercepting Proxy Server 112, may as far as the Client 108 can determine, appear to be correctly contained in clear text in subsequent or later responses from the Cloud 104. In reality however, the real data elements were encrypted before they physically left the enterprise 102, and were decrypted and restored to clear text by the Intercepting Proxy Server 112 in responses from the Cloud 104.

To summarize, all data coming back from the cloud application is checked for obfuscating or encrypted tokens, and those tokens are converted back into real data values.

Figure 6:
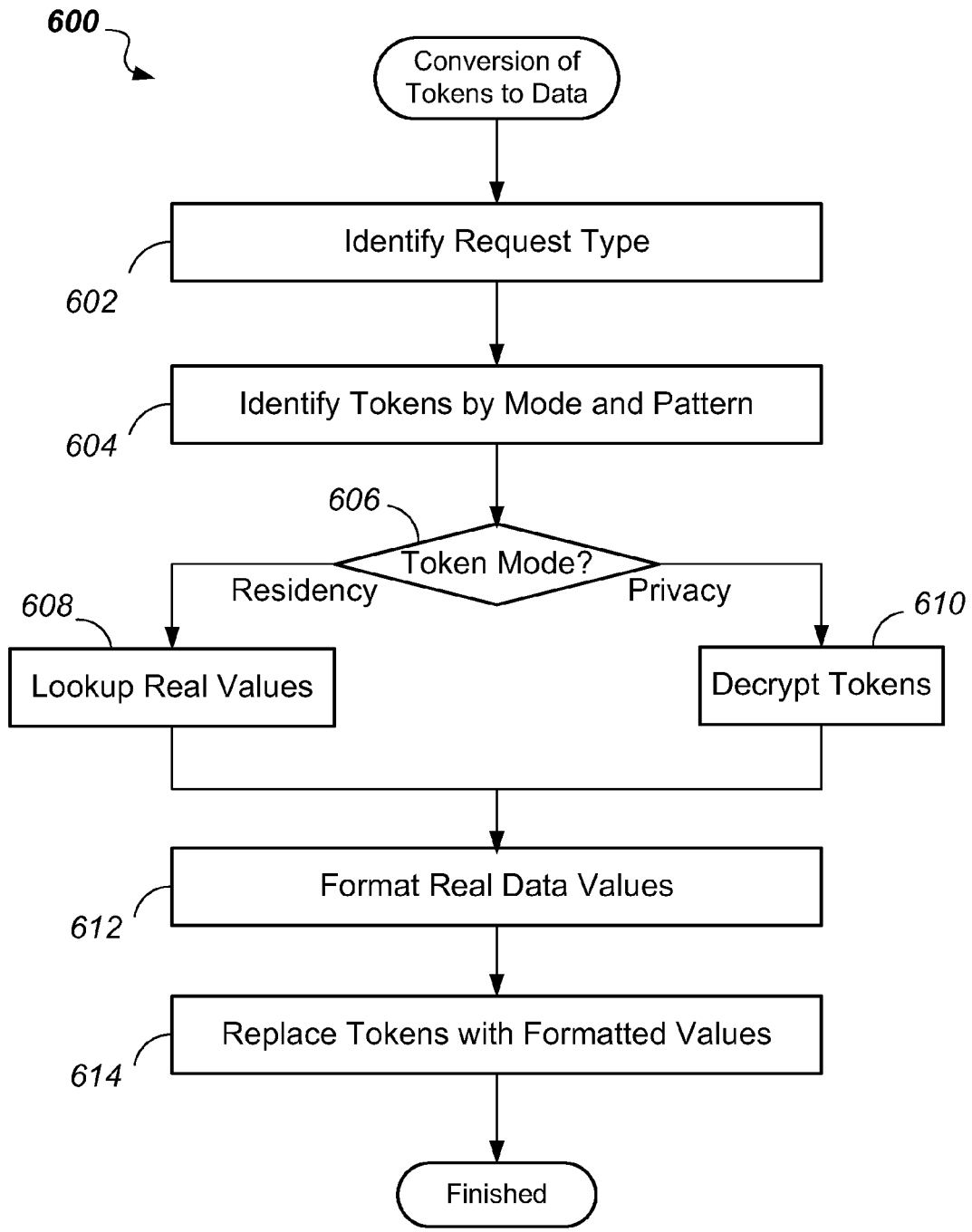
FIG. 6 is a flowchart of a "Conversion of Tokens to Data" process 600.

FIG. 6 is a flowchart of a "Conversion of Tokens to Data" process 600, including steps:
602 "Identify content type";
604 "Identify Tokens by mode and pattern";
606 "Security Mode?";
608 "Lookup Real Data Values";
610 "Decrypt Tokens";
612 "Format Real Data Values"; and
614 "Insert Formatted Real Data values".

At the step 602 "Identify content type" the Returned Data Object 502 received by the Intercepting Proxy Server 112 in the data stream from the Cloud 104 may contain different types of content. Depending on the content type, the processing of the stream may vary. For example in the case of an attachment the whole data stream is only the attachment, so processing can be optimized. In most cases the data stream is processed and obfuscated information is extracted for conversion to clear text.

At the step 604 "Identify Tokens by mode and pattern", the tokens are stripped from the content by identifying the prefix and suffix. Resident Tokens representing locally stored real data values are processed differently from encrypted tokens.

At the step 606 "Security Mode?", the Mode of obfuscation is determined from the Attribute 302 to which the token is mapped, i.e. "Residency" mode using resident tokens or "Privacy" mode which uses "encrypted tokens".

If the Mode is "Privacy", the token values are merely decrypted in the step 610 "Decrypt Tokens" which yields the real data values, and execution continues with the step 612. If the Mode is "Residency", the real data values are retrieved in the step 608 "Lookup Real Data Values" by using the token values to index the lookup table 508 in the Local Persistent Storage layer 114 as described above (FIG. 5). The token to value map, i.e. the look up table 508 may be partly cached in the memory of the Intercepting Proxy Server computer 112 to speed up access.

The tokens are identified and their position and context in the data stream, i.e. in the Returned Data Object 502, are recorded.

At the step 612 "Format Real Data Values", the retrieved or decrypted real data values (see steps 610 and 608 above) are formatted by the Context Formatting function 520 according to the context of the data in the Returned Data Object 502 which is the same as the context of the data in the modified returned data object 504.

At the step 614 "Insert Formatted Real Data values", the formatted Real Data Values 518, which are replacing the corresponding Tokens-to-be-replaced 516, are inserted into the result data stream, i.e. into the modified returned data object 504.

Sort-Order-Preserving Tokens

One of the challenges when obfuscating data via tokenizing real data elements with obfuscating or encrypting tokens as described above, is the loss of certain characteristics of the data, one of which is the sort order. Depending on the context, the obfuscated data may still require to be rendered by the Cloud 104 via a report, an ordered list, a view on a web page, etc. in the sorted order, without revealing the original values. In another embodiment, the present invention provides a technique that allows data to be obfuscated via whatever encoding method is required in order to preserve the security of the value being revealed, while at the same time preserving the sort order to a configurable degree of accuracy so as to be usable in contexts that render ordered lists.

One of the characteristics of encryption is the inability of most encryption algorithms to preserve sort order. The manner in which encryption is performed typically renders the resulting encrypted value unusable for sort ordering. This means that, in a data management context such as reporting, list viewing, or other human readable applications of the data, the rendering of the list of data frequently must be performed using the real values. However, there are a number of contexts and use cases that require the data to be ordered, even if tokenized or encrypted.

While there are known techniques for preserving sort ordering while obfuscating the original data values, there is a trade off of data security versus data ordering accuracy. For example, one technique to preserve sort ordering while performing data obfuscation is to use a sort order preserving data compression algorithm such as described in U.S. Pat. No. 5,270,712 issued to Iyer et al. This compression algorithm utilizes a derivative of the Ziv-Lempel compression technique involving a tree structure for data compression. The challenge with this technique is that, while it renders the original data obfuscated and preserves the original data sort order, it is not very secure because the encryption would be fairly easy to break. In a structured application context, for example, the list of data may be first names, states, provinces, or cities. Knowledge of the domain of the data would enable an attacker to easily guess at a first couple of tree branches in the structure, and then leave the rest of the decoding to a dictionary attack. The dictionary attack would provide the attacker with enough information to reconstruct the rest of the encoding tree, allowing the attacker to then decode any other real values encoded using that tree structure.

The solution proposed here is a hybrid approach to the generation of a sort-order preserving obfuscated value by prefixing the already obfuscated replacement value with a "sort prefix" code.

Essentially, a Liv-Zempel technique is used to generate a "sort prefix" code, which may represent all or only the first few characters of the real data value. As described earlier, each sensitive real data value may have been encoded using standard encryption yielding an encrypted token or may have been replaced entirely with a resident token. The resulting token value 220 is encapsulated with Prefix 224 and Suffix 226 codes, see FIG. 2 and example #4 in Table 1. By extending or replacing the Prefix 224 with the "sort prefix", the rendering of the data in a list, report, or other context based on the obfuscated value can be performed in an ordered fashion, but the value is not as susceptible to the attack problems discussed earlier.

Preferably, in order to enhance security, not the entire real data value is encoded using the sortable compression algorithm, but only the first few characters are used. Depending on the actual sort accuracy requirement, this may be the first character alone, the first few characters, or a configurable number of characters.

Figure 7:
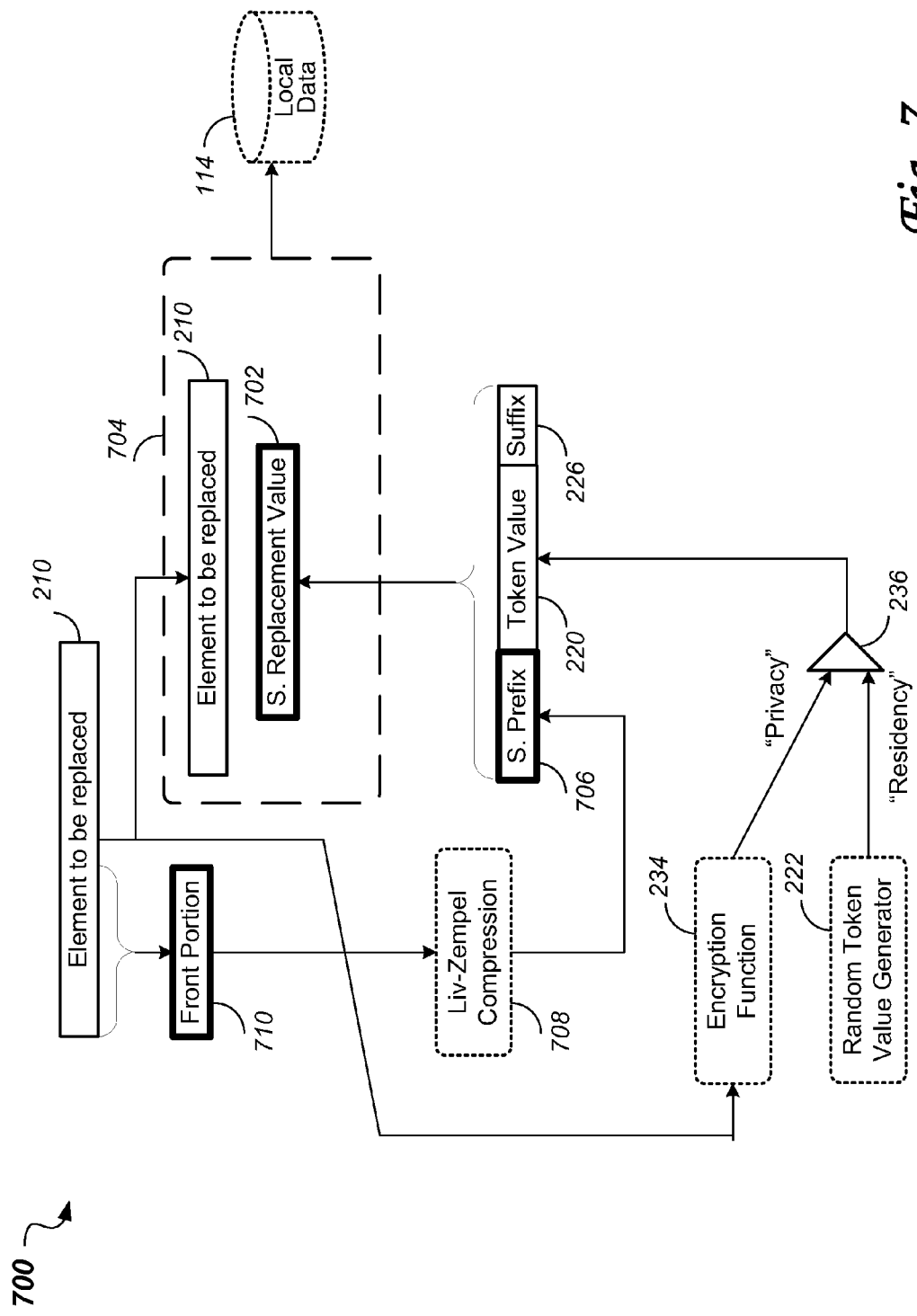
FIG. 7 shows a data flow diagram 700 illustrating the generation of a sort-preserving obfuscating token, referred to as a Sort Replacement Value 702, according to another embodiment of the invention.

FIG. 7 shows a data flow diagram 700 illustrating the generation of a sort-preserving resident token, referred to as a Sort Replacement Value 702. By analogy with the data flow diagram 200 of FIG. 2, a Sort Storage Record 704 is generated in respect of one of the Elements-to-be-replaced 210 of the Received Data Object 202 (not shown in FIG. 7). The Sort Storage Record 704 includes a copy of the Element-to-be-replaced 210, the Sort Replacement Value 702, and may contain other data such as the record id (not shown in FIG. 7), and will be stored in the Local Persistent Storage layer 114.

The Sort Replacement Value 702 is composed of a Sort Prefix 706, concatenated with the Token Value 220 and the token Suffix 226. The Token Value 220 is generated by the Random Token Value generator function 222 as described above. Similarly, the value of the token Suffix 226 is chosen for delineating the Sort Replacement Value 702 as described earlier.

The Sort Prefix 706 is generated by a Liv-Zempel Compression function 708 from a Front Portion 710 of the Element-to-be-replaced 210.

In this way, any rendering of a list of the encoded values (i.e. the sort replacement values, would come arbitrarily close to the sort order of the original values, depending on the chosen length of the Front Portion 710. This technique of combining the Liv-Zempel Compression (on a selected front portion of the data element) with the random token value, has the virtue of not being as susceptible to the attack described above. An attacker may still be able to determine the first character with some level of certainty, but since they would no longer have all of the characters encoded within the Liv-Zempel tree, the token is no longer susceptible to a dictionary attack. Instead, the remainder of the Sort Replacement Value 702 is tokenized or may be encrypted, neither of which is related to the Liv-Zempel tree, and hence not susceptible to a dictionary attack to determine the actual value.

The tradeoff is the degree of sort order accuracy. By only using the first few characters of the actual value as the sort characters, it may not be perfectly sortable. However, depending on the context, a perfect sort may not be required. The first few characters may be more than sufficient for sorting a small set of data with a relatively even distribution of sorted data across the alphabet. The technique described is not only applicable to strings composed of single-byte characters, but also to multi-byte character sets, and even mixed characters within a UTF-8 or UTF-16 set of data.

As shown in FIG. 2 already, the Token Values 220 are generated by a Random Token Value generator function 222 in the "Residency" mode. In the "Privacy" mode, the Token Values 220 are simply generated by encrypting the Elements-to-be-replaced 210 in the standard Encryption Function 234. The appropriate Token Value 220 as selected in the Mode Selector 236, is then prefixed with the Sort Prefix 706 and the Token Suffix 226 is appended.

When an instance of a Sort Replacement Value 702 is returned from the Cloud 104 as the "Token to be replaced" 516 in the Returned Data Object 502 (see FIGS. 5A and 5B), the corresponding Real Data Value 518 is recovered from the look up table 508 as shown in FIG. 5A, which applies in "Residency" mode of operation. In the "Privacy" mode (FIG. 5B), decrypting the encrypted token value returns the original clear text value. In either mode, the sort prefix is merely for use by the Cloud 104 in the rendering of the data to provide a specific degree of sorting accuracy.

The Intercepting Proxy Server computer 112 is a computer equipped with software programs for enabling the features of the embodiments of the invention to be described below. Some or all of the functions of the Intercepting Proxy Server computer 112 may also be implemented with an Application Specific Integrated Circuit (ASIC) or a number of ASICs.

Figure 8:
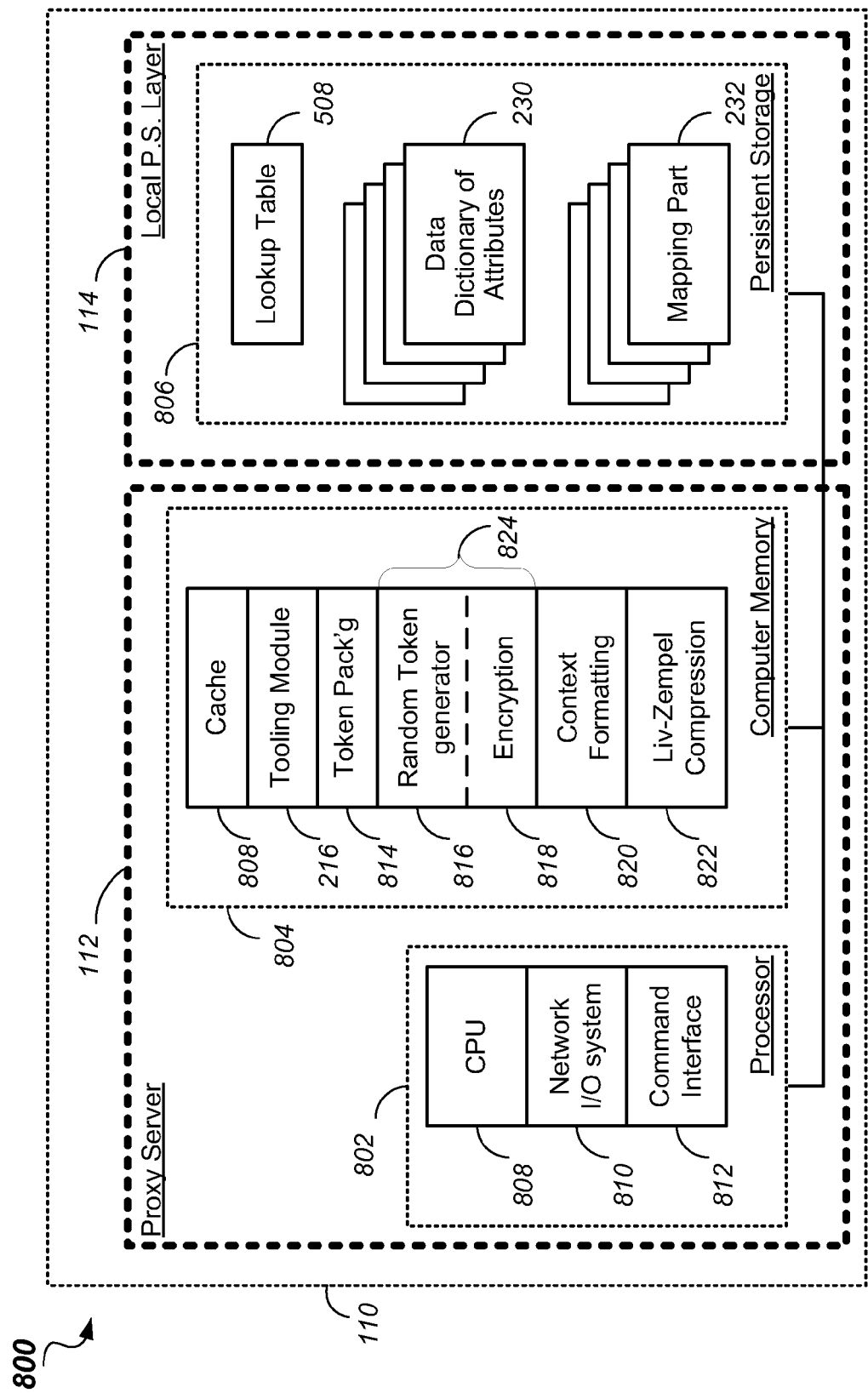
FIG. 8 shows an exemplary hardware view 800 of the Ultimate Obfuscation Solution 110 of FIG. 1.

FIG. 8 shows an exemplary hardware view 800 of the Ultimate Obfuscation Solution 110 comprising the Intercepting Proxy Server computer 112, including a Processor 802 and a Computer Memory 804, and a Persistent Storage unit 806 in the Local Persistent Storage layer 114, according to the embodiments of the invention.

The Processor 802 may be any commercial processor capable of executing programs under an operating system such as, but not limited to, Linux, Microsoft Windows, or Mac Operating System 10 (OSX) for example, comprising a Central Processing Unit (CPU) 808, a Network Input/Output (I/O) system 810 and a Command Interface 812.

The CPU 808 may be any of a number of commercial processor implementations, including a multi-processor. The Network Input/Output (I/O) system 810 provides an interface facility to the Internet 106 via the optional Firewall 116, and to the Client 108, see FIG. 1. The Command Interface 812 may include a keyboard, mouse, and visual interface, as well as removable storage devices, or any other hardware suitable for controlling a software configuration as well as the operations of the Intercepting Proxy Server computer 112.

The Processor 802 is connected to the Computer Memory 804 which is preferably a non-transitory memory device such as dynamic memory (DRAM) capable of storing software programs and related data. Software modules which include computer executable instructions for execution by the Processor 802 are stored in the Computer Memory 804, comprise: the Tooling module 216, a Token Packaging module 814 for performing the Token Packaging function 218, a Random Token Value generator module 816 for performing the Random Token Value generator function 222, an Encryption Engine 818 for performing the Encryption Function 234, a Context Formatting module 820 for performing the Context Formatting function 520, and a Liv-Zempel Compression Engine 822 for performing the Liv-Zempel Compression function 708.

In some embodiments of the invention, the Random Token Value generator module 816 and the Encryption Engine 818 are combined into a Token Generator module 824.

The Computer Memory 804 may also include a Cache 808 for temporarily storing a full or partial copy of data such as the Look Up Table 508 which is preferably more permanently stored in the Local Persistent Storage layer 114.

The Processor 802 is also connected to the Local Persistent Storage layer 114 which may be implemented in any of a number of persistent storage technologies including, but not limited to, for example a hard disk or a flash drive. Data stored in the Local Persistent Storage layer 114, may also be stored simultaneously in the Computer Memory 804 for periods while it is actively being used by the Processor 802.

The Local Persistent Storage layer 114 is used for storing persistent information, primarily configured information, as well as information regarding cloud applications that are being used by the Client 108, such as a set of the application specific metadata records for use by the Tooling module 216, comprising the Data dictionaries of Attributes 230, and the Mapping parts 232.

Methods and apparatus for intercepting transactions between a client and a cloud application have been described in a number of embodiments, including encrypting real data into tokens ("Privacy" mode), replacing real data with token of random value ("Residency" mode), and combining the tokens with sort-order preserving prefixes. These techniques can be used individually, or in combination, on the data elements of client-to-cloud traffic, for the purpose of disguising or hiding sensitive data, and for enhancing the usability of the obfuscated information by the cloud application in some instances.

It is also understood that the methods of obfuscating data of the embodiments of the invention can also be used in various other software applications, i.e. other than cloud computing, where obfuscating of data may be required.

Although embodiments of the invention have been described in detail, it will be apparent to one skilled in the art that variations and modifications to the embodiments may be made within the scope of the following claims.

What is claimed is:

1. A method of obfuscating sensitive data in a data object, comprising:
at an intercepting proxy server computer:
creating a token having a token value by encrypting a sensitive data element in the data object;
concatenating a predetermined prefix or suffix with the token value to generate a replacement value, wherein the prefix or suffix identifies a data type of the sensitive data element;
replacing the sensitive data element with the replacement value, thus generating a modified data object;
transmitting the modified data object from the intercepting proxy server computer to the server computer in a cloud;
receiving from the server computer in the cloud, a returned data object corresponding to the modified data object comprising a returned data element;
extracting the token value from the returned data element;
generating the sensitive data element, comprising decrypting the token value;
formatting the sensitive data element based on a context of the sensitive data element in the returned data object, thus generating a formatted sensitive data element; and
replacing the returned data element with the formatted sensitive data element thereby generating a modified returned data object.

2. The method of claim 1 wherein the context in the modified data object comprises metadata describing the sensitive data element.

3. The method of claim 1, further comprising:
receiving the data object from a client device; and
transmitting the modified returned data object to the client device.

4. The method of claim 1, wherein the prefix or suffix identifies the sensitive data element as an email attachment.

5. The method of claim 1 further comprising identifying the sensitive data element in the data object.

6. The method of claim 5, the identifying the sensitive data element further comprises:
mapping the data in the data object against a dictionary of attributes; and
identifying the sensitive data element using a corresponding attribute in the dictionary.

7. The method of claim 1 further comprising identifying the returned data element as a token-to-be-replaced.

8. The method of claim 7, wherein the identifying the returned data element as the token-to-be-replaced further comprises:
mapping data in the returned data object against a dictionary of attributes; and
identifying the token-to-be-replaced using a corresponding attribute of the returned data element of the returned data object.

9. The method of claim 1 wherein a type of a data structure containing the sensitive data element is selected from the group consisting of HTML (Hypertext Markup Language), XML (Extensible Markup Language), SOAP (Simple Object Access protocol), and JSON (JavaScript Object Notation).

10. An intercepting proxy server computer, comprising:
a processor; and
a memory having computer readable instructions stored thereon for execution by the processor, for causing the processor to:
create a token having a token value by encrypting a sensitive data element in a data object;
concatenate a predetermined prefix or suffix with the token value to generate a replacement value, wherein the prefix or suffix identifies a data type of the sensitive data element;
replace the sensitive data element with the replacement value, thus generating a modified data object;
transmit the modified data object from the intercepting proxy server computer to the server computer in a cloud;
receive from the server computer in the cloud, a returned data object corresponding to the modified data object comprising a returned data element;
extract the token value from the returned data element;
generate the sensitive data element, comprising decrypting the token value;
format the sensitive data element based on a context of the sensitive data element in the returned data object, thus generating a formatted sensitive data element; and replace the returned data element with the formatted sensitive data element thereby generating a modified returned data object.

11. The intercepting proxy server computer of claim 10, wherein the computer readable instructions cause the processor to format the sensitive data element according to the context in the modified data object comprising metadata describing the sensitive data element.

12. The intercepting proxy server computer of claim 10, wherein the computer readable instructions further cause the processor to:
receive the data object from a client device; and
transmit the modified returned data object to the client device.

13. The intercepting proxy server computer of claim 10, wherein the prefix or suffix identifies the sensitive data element as an email attachment.

14. The intercepting proxy server computer of claim 10, wherein the computer readable instructions further cause the processor to identify the sensitive data element in the data object.

15. The intercepting proxy server computer of claim 14, wherein the computer readable instructions that cause the processor to identify the sensitive data element cause the processor to:
map the data in the data object against a dictionary of attributes; and
identify the sensitive data element using a corresponding attribute in the dictionary.

16. The intercepting proxy server computer of claim 10, wherein the computer readable instructions further cause the processor to identify the returned data element as a token-to-be-replaced.

17. The intercepting proxy server computer of claim 16, wherein the computer readable instructions that cause to processor to identify the returned data element as the token-to-be-replaced cause the processor to:
map data in the returned data object against a dictionary of attributes; and
identify the token-to-be-replaced using a corresponding attribute of the returned data element of the returned data object.

18. A computer network, comprising the intercepting proxy server computer of claim 10.

19. The intercepting proxy server computer of claim 10 wherein a type of a data structure containing the sensitive data element is selected from the group consisting of HTML (Hypertext Markup Language), XML (Extensible Markup Language), SOAP (Simple Object Access protocol), and JSON (JavaScript Object Notation).

20. An intercepting proxy server computer, comprising:
a processor having a network input/output (10) system;
a memory having computer readable instructions stored thereon for execution by the processor, causing the processor to obfuscate data in a data object, the computer readable instructions forming:
a tooling module for identifying a sensitive data element in the data object;
a token generator module for creating a token having a token value comprising encrypting the sensitive data element; and
a token packaging module for concatenating a predetermined prefix or suffix with the token value to generate a replacement value, and replacing the sensitive data element with the replacement value, thus generating a modified data object, wherein the prefix or suffix identifies a data type of the sensitive data element, and
wherein,
the network input/output (10) system is further configured to transmit the modified data object from the intercepting proxy server computer to the server computer in a cloud,
the network input/output (10) system is further configured to receive a returned data object, comprising a returned sensitive data element, from the server computer in the cloud, and
the intercepting proxy server computer further comprises a context formatting module configured to format the returned sensitive data element according to a context of a the sensitive data element in the returned data object and replace the sensitive returned data element with a formatted sensitive data element, thereby generating a modified returned data object.

21. The intercepting proxy server computer of claim 20, wherein the context formatting module is further configured to format the sensitive data element according to the context in the modified data object comprising metadata describing the sensitive data element.

22. The intercepting proxy server computer of claim 20, wherein:
the network input/output (10) system is configured to receive the data object from a client device; and
the network input/output (10) system is further configured to transmit the modified returned data object to the client device.

23. The intercepting proxy server computer of claim 20, wherein the prefix or suffix identifies the sensitive data element as an email attachment.

24. The intercepting proxy server computer of claim 20, wherein the tooling module is further configured to map the data in the data object against a dictionary of attributes and identify the sensitive data element using a corresponding attribute in the dictionary.

25. The intercepting proxy server computer of claim 20, wherein the tooling module is further configured to identify the returned data element as a token-to-be-replaced.

26. The intercepting proxy server computer of claim 25, wherein the tooling module is further configured to map data in the returned data object against a dictionary of attributes and identify the token-to-be-replaced using a corresponding attribute of the returned data element of the returned data object.

27. The intercepting proxy server computer of claim 25, wherein the computer readable instructions further form a decryption module configured to extract the token value from the token-to-be-replaced and to generate the sensitive data element by decrypting the token.

28. A computer network, comprising the intercepting proxy server computer of claim 20.

29. The intercepting proxy server computer of claim 20 wherein a type of a data structure containing the sensitive data element is selected from the group consisting of HTML (Hypertext Markup Language), XML (Extensible Markup Language), SOAP (Simple Object Access protocol), and JSON (JavaScript Object Notation).

* * * * *